United States Patent [19]

Kraicar

[11] Patent Number: 4,731,550

[45] Date of Patent: Mar. 15, 1988

[54] CIRCUIT HAVING A FEED CIRCUIT FOR SUPPLYING CURRENT TO A LOAD RESISTOR

[75] Inventor: Heinz Kraicar, Poecking, Fed. Rep. of Germany

[73] Assignee: Siemens Aktiengesellschaft, Berlin and Munich, Fed. Rep. of Germany

[21] Appl. No.: 767,816

[22] Filed: Aug. 20, 1985

[30] Foreign Application Priority Data

Sep. 10, 1984 [DE] Fed. Rep. of Germany ....... 3433142

[51] Int. Cl.[4] .......................... H01H 3/26; G05F 1/40
[52] U.S. Cl. .................................... 307/140; 307/112; 307/77; 323/282
[58] Field of Search ................ 307/140, 112, 77, 326; 324/62 R, 99 D; 340/652; 323/282, 278, 265, 292

[56] References Cited

U.S. PATENT DOCUMENTS

| | | | |
|---|---|---|---|
| 3,670,233 | 6/1972 | Zellmer et al. | 323/282 |
| 3,671,852 | 6/1972 | Ritzenthaler | 323/278 |
| 3,733,525 | 5/1973 | Ballman | 323/282 X |
| 3,906,310 | 9/1975 | Esashika | 323/282 X |
| 3,983,472 | 9/1976 | Morris | 323/282 X |
| 4,242,629 | 12/1980 | Shuey | 323/282 X |
| 4,362,952 | 12/1982 | Ziegler | 307/77 |
| 4,507,568 | 3/1985 | Ziegler et al. | 307/112 |
| 4,562,401 | 12/1985 | Ziegler | 307/112 X |

FOREIGN PATENT DOCUMENTS 1154525 9/1963 Fed. Rep. of Germany .
1155172 10/1963 Fed. Rep. of Germany .
1157663 11/1963 Fed. Rep. of Germany .
0139399 10/1979 Japan .

OTHER PUBLICATIONS

"Elektrisch Fernuberwachen und Fernbedienen," Jahn, 1962, p. 218.
"Schalterdienst," Regler, Funkschau, vol. 1, 1983, pp. 67-71.

Primary Examiner—William M. Shoop, Jr.
Assistant Examiner—Sharon D. Logan
Attorney, Agent, or Firm—Hill, Van Santen, Steadman & Simpson

[57] ABSTRACT

A circuit for supplying current to a load connected to a pair of output leaves of the circuit has at least one feed circuit, an electronic switch disposed between the feed circuit and the leaves having a transistor with a control electrode and a controlled path, and a control means for operating the electronic switch to disconnect the feed circuit from at least one of the leads when the feed circuit de-energized and to connect the feed circuit to at least one of the leads when the feed circuit is energized. The control means has a further transistor with a controlled path connected in series with the control electrode of the transistor in the electronic switch, and a control electrode connected to the controlled path of the transistor in the electronic switch. The control means further has a resistor connected between the control electrode of the further transistor and one of the load leads.

15 Claims, 8 Drawing Figures

CIRCUIT HAVING A FEED CIRCUIT FOR SUPPLYING CURRENT TO A LOAD RESISTOR

BACKGROUND OF THE INVENTION

1 Field of the Invention

The present invention relates to feed circuits for supplying current to a load resistor, and in particular to such a circuit with a means for protecting its output with unwanted voltages of an opposite polarity and which has a switching element which is substantially fully driven even given low output voltages.

2 Description of the Prior Art

A circuit is known from German patent application No. P 34 25 536.2, corresponding to U.S. Pat. No. 4,629,905, having a feed circuit for feeding a load resistor, wherein the feed circuit is conducted via an electronic switch controllable by a control means to a lead pair for the connection of a load circuit and wherein the electronic switch contains the control path of a first transistor in one of the feed current paths leading from the feed circuit to the lead pair, and a control terminal of the first transistor is conducted to such a control potential that the first transistor is conductive given an activated feed circuit and is inhibited given a deactivated feed circuit. The anode-cathode path of a thyristor is disposed parallel to the controlled path of the first transistor and the control electrode of the thyristor connected via a first resistor to the one principal electrode of the thyristor and, via a non-linear bipole in the manner of a Zener diode which is inhibited at voltages below a threshold voltage and is conductive at voltages above a threshold voltage, to the other principal electrode of the thyristor. The first resistor lies parallel to the control path of the thyristor. The load resistor can thereby be composed of one or more partial resistances. The first transistor can be a field effect transistor or a bipolar transistor.

The circuit arrangement described above two feed circuits which can be connected to a user with opposite polarity and has an apparatus for the optionally feeding the load resistor by means of the one or the other feed circuit. The output of the operative feed circuit is conducted to the load resistor via a switch device which contains an automatically engageable and disengageable electronic switch constructed with a transistor and a thyristor.

The electronic switch is transmissive given an activated feed circuit and is inhibited given a deactivated feed circuit. Since the feed circuit provided with the switch means and the further feed circuit are alternately activated or deactivated with oppositely polarized output voltage, the electronic switch prevents the output of a deactivated feed circuit from loading the output of an activated feed circuit. This is of particular significance given feed circuits wherein a diode is effective at the output, this diode being inhibited for the output voltage of the feed circuit but being poled in the conducting direction for the output voltage of the other feed circuit, and therefore practically constituting a short-circuit of the output voltage for the other feed circuit. Such a diode effective at the output may be a component part of a rectifier circuit of a converter or rectifier or may be a diode additionally inserted for the protection of the feed circuit.

When the switch means is controlled dependent on the output voltage of the operative feed circuit, difficulties may arise when operating conditions are possible wherein the feed circuit emits only a very low output voltage which does not fully drive the transistor or the electronic switch.

A circuit arrangement comprising two feed circuits which are connectable to a load resistor with opposite polarity is disclosed in German OS No. 32 16 497. In this known circuit arrangement, one feed circuit is composed of a constant current source. The further feed circuit is obtained by connecting a voltage limiter to the constant current source. For protection in the locating made, a reduction of the device voltage to, for example, a maximum of 60 V is undertaken. The two feed circuits are conducted via a common pair of feed current paths to a switch-over means which optionally connects the load resistor to the two feed current paths with the one or with the other polarity. Serving as switch-over means is a relay which enables automatic fault locating and is correspondingly driven.

The load resistor in this known circuit is a remote feed loop which feeds a plurality of series-connected users with constant DC. The remote feed loop is provided with shunt arms which respectively contain a diode polarized in the non-conducting direction for the remote feed voltage and a resistor disposed in series therewith. When a test voltage polarized opposite to the remote feed voltage is applied to the input of the remote feed loop and when the remote feed loop is interrupted at any location whatsoever, a current then flows in all shunt arms preceding the interrupt location. The sum current is measured at the feed location. An interrupted repeater field is allocated to every measured value.

The remote feed device is switched from constant current to constant voltage. This becomes more difficult the higher the remote field power is in comparison to the locating power. Further, the polarity reversal is relatively complicated given series operation of remote feed devices.

Another possibility for the optional feed of an electrical user with voltages having different polarities is employment of mechanical contacts with manual actuation.

Further, it is already known from W. S. Jahn, "Elektrisch Fernuberwachen und Fernbedienen", 1962, Richard Pflaum Verlag Munchen, Page 218 to use multiple electrical lines in electrical remote control wherein remote control signals having different polarities are employed.

SUMMARY OF THE INVENTION

It is an object of the present invention to provide a circuit arrangement of the type initially cited such that the feed circuit is reliable protected at its output against stray voltages of the opposite polarity and such that the transistor contained in the electronic switch is at least approximately fully driven even given low output voltages.

In accordance with the principles of the present invention, a circuit arrangement is designed for resolving this object wherein the control device contains a second resistor disposed in the load current circuit of the feed circuit in series with the controlled path of the first transistor and contains a second transistor having its controlled path connected to the second resistor, and the control terminal of the first transistor is conducted via the controlled path of the second transistor to that terminal of the second resistor closer to the load.

As used herein, a "controlled path" of a transistor is a source-drain or emitter-collector path, a "control path" of a transistor is a gate-source or base-emitter path, and a "control electrode" is a gate or base of a transistor.

The second transistor may be a bipolar transistor or a field effect transistor.

When the feed circuit provided with the switch means is activated, the thyristor of the semiconductor switch first carries current, until the transistor accepts the current. An advantage resulting therefrom is that the transistor contained in the semiconductor switch does not develop inadmissably high stray power even in the operating condition in which the feed circuit generates a high output current with a very low output voltage.

When, in a further embodiment of the invention, the feed circuit is a constant current source, this cannot be terminated without further difficulties with a low impedance load resistor or even with a short-circuit circuit without the danger of an overload arising for the electronic switch. Therefore in this embodiment, a further constant current source is disposed in the load circuit of the constant current source, and the rated values of the constant current sources need not exactly coincide in order to assure a reliable function of the switch device composed of the electronic switch and control means. When the constant current source provided with the switch device has a somewhat lower rated value of the output current than the further constant current source or, respectively, the further constant current sources, it then emits a very low output voltage, and does this advantageously without deteriorating the reliable function of the switch device.

Preferably, the control terminal of the second transistor is preceded by a third resistor. In a further embodiment of the invention, the circuit arrangement is designed such that a resistor and/or a Zener diode is disposed parallel to the control path of the first transistor and such that a fourth resistor is disposed between the controlled path of the second transistor and the second resistor. Particularly given of a Zener diode parallel to the control path of the first transistor, it is thereby reliably avoided that too great a part of the output current can flow via the controlled path of the second transistor, given a short-circuit at the output of the feed circuit.

Further protection for the second transistor can be achieved with simple means in that a Zener diode polarized in the nonconducting direction for the output current of the allocated feed circuit is disposed parallel to the series connection composed of the controlled path of the first transistor, the second resistor and the fourth resistor.

Use of the circuit arrangement disclosed herein is particularly advantageous in an arrangement comprising two feed circuits connectable to a user with opposite polarity, a lead pair for the electrical load resistor respectively connected to the feed circuits via feed current paths, and a device for optional feed of the load resistor by means of the one or the other feed circuit, whereby switch means provided for the activation of the feed circuit having the electronic switch and the control means are disposed outside of the output circuit, at least in the case of this feed circuit.

One feed circuit is preferably a remote feed current source for the remote feed of electrical users lying in a remote feed loop with DC series feed and the other feed circuit is a test voltage source of a device for testing the resistance of the remote feed loop. The feed circuit forming the remote feed current source is activatable and/or deactivatable dependent on the loop impedance by means of a device for testing the loop impedance by means of switch disposed outside of the output circuit.

Given employment of the circuit arrangement in a remote feed device comprising a fault locating and/or test means, a separate auxillary voltage is preferably employed as a test voltage source or, respectively, locating voltage source, this auxillary voltage being capable of being generated by a small converter involving relatively little outlay. The auxillary voltage is constant and is dimensioned from the very outset to meet personal protection demands.

DESCRIPTION OF THE PREFERRED EMBODIMENTS

Figure 1:
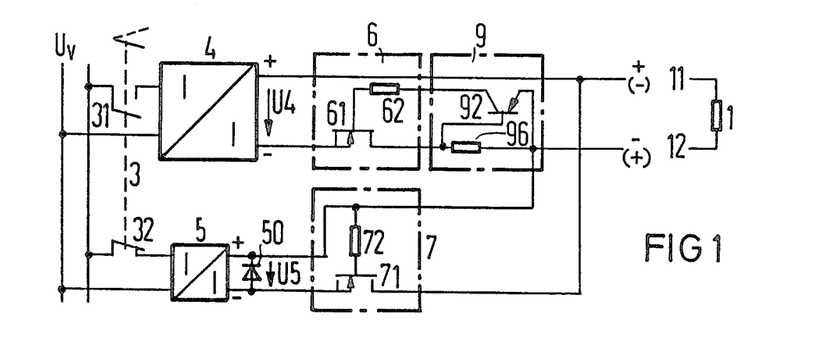
FIG. 1 is a schematic circuit diagram of a circuit arrangement constructed in accordance with the principles of the present invention having two feed circuits for feeding a load resistor with voltages having opposite polarity.

The circuit arrangement shown in FIG. 1 contains two feed circuits 4 and 5. The feed circuit 4 serves as a remote feed current source and is connected to the supply voltage $U_V$ via the switch 31. The feed circuit 5 serves as a test voltage source and is connected via the switch 32 to the supply voltage $U_V$. The switches 31 and 32 are actuated in common such that only one is open while the other is closed.

The feed circuit 4 emits the positive voltage U4 at its output. The diode 50 polarized in the non-conducting direction is effective at the output of the feed circuit 5 for the output voltage U5.

The outputs of the feed circuits 4 and 5 are conducted via respective electronic switches 6 and 7 to the common load resistor 1. Proceeding from the output of the feed circuit 4, the positive pole is conducted directly to the terminal 11 of the load resistor 1 and the negative pole is conducted via the source-drain path of the power field effect transistor 61 and via the resistor 96 connected in series thereto to the terminal 12 of the load resistor 1. The controlled electrode of the field effect transistor 61 is conducted via the collector-emitter path of the bipolar transistor 92 to the positive pole of the output of the feed circuit 5.

The electronic switch 7 is designed as voltage-controlled transistor switch. The source-drain path of the power field effect transistor 71 is in the current path which leads from the negative pole of the feed circuit 5 to the terminal 11 of the load resistor 1. The control electrode of the field effect transistor 71 is connected via the resistor 72 to the positive pole of the output of the feed circuit 5.

In the circuit arrangement of FIG. 1, the field effect transistors 61 and 71 are of the n-type and are respectively disposed in into the negative line of the operative feed circuit. When a field effect transistor of the p-type is employed, the source-drain path is in the positive line such that the source electrode is connected to the positive pole of the output of the feed circuit 4 or 5. Given the modified electronic switch 6, a bipolar transistor of the npn type is employed as the bipolar transistor. Given the modified eletronic switch 7, the gate drop resistance is connected to the negative line of the operative feed circuit.

In applying the circuit arrangement of FIG. 1, a bipolar transistor can, under given conditions, replace the field effect transistor 61 and/or a field effect transistor can replace the bipolar transistor 92.

Further, the electronic switch 7 can be replaced by an electronic switch in the fashion of the electronic switch 6.

Figure 2:
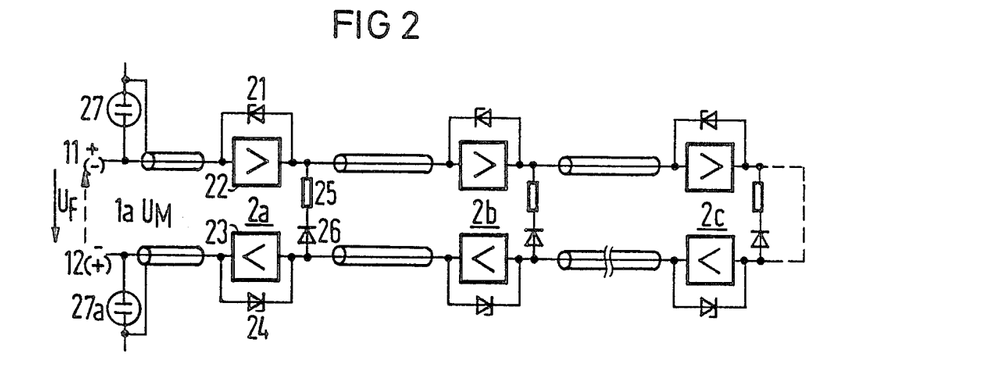
FIG. 2 is a schematic circuit diagram of a remote feed loop constructed in accordance with the principles of the present invention having remotely fed regenerators and diode shunt arms.

FIG. 2 shows a circuit arrangement for locating an interrupt location of a remote feed loop for series-fed regenerators. In order to be able to locate an interrupt location of the remote feed loop, the remote feed loop is provided with shunt arms which respectively contain a diode 26 and a resistor 25 disposed in series thereto. The diodes 26 are inhibited given remote feed operation. Fault locating ensues by means of feeding the remote feed loop with a voltage having reversed polarity.

Given the remote feed loop 1 shown in FIG. 2, the polarity without brackets is effective in normal operation. Given interruption of the remote feed path, the reversed polarity which is shown in brackets is switched on. In this switch condition, the line impedance, which is composed of the resistors 25 switched parallel up to the interrupt location, can be identified with a current-voltage measurement and thus the interrupted repeater field can be identified.

The circuit arrangement shown in FIG. 1 makes possible optional connection of the remote feed voltage $U_F$ or the locating voltage $U_M$ to the remote feed loop 1a via an electronic switch 6 which, without external drive, automatically becomes conductive given remote feed operation and automatically inhibits given locating. When, for example, contact 31 is opened and contact 32 is closed, only the feed circuit 5 formed by an auxilliary convertor is in operation. It generates, for example, 40 V and controls the field effect transistor 71 such that it becomes transmissive. The field effect transistor 61 is not driven since the current at the feed circuit 4 designed as a main convertor, is "0". The locating voltage 40 V is across to the remote feed output 11, 12 with the polarization (+)(−). This locating voltage cannot feed any current in the feed circuit 4 since the field effect transistor 61 inhibits.

Figure 4:
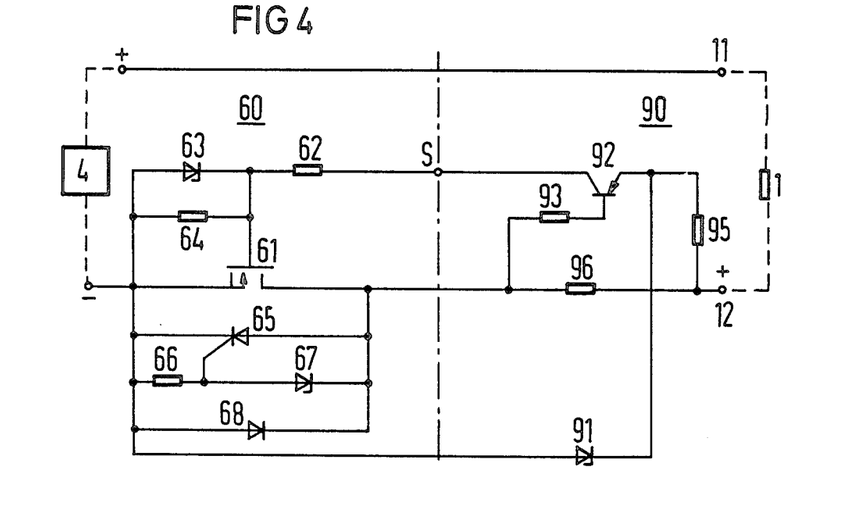
FIG. 4 is a schematic circuit diagram of an electronic switch constructed in accordance with the principles of the present invention having a field effect transistor controlled dependent on the load current of a feed circuit.

In accord with FIG. 4, a thyristor is connected parallel to the field effect transistor 61. When the contact 31 is closed and the contact 32 is opened, the remote feed voltage is at the remote feed output 11, 12 with the polarization + −. The field effect transistor 61 is transmissive as soon as the remote feed current flows and the field effect transistor 71 inhibits. Thus, by means of alternate turn-off and turn-on of the feed circuit 4 or 5, either the remote feed voltage with constant current or the oppositely polarized constant locating voltage can be obtained at the remote feed output 11, 12.

During operation of the feed circuit 4, the field effect transistor 71 must inhibit the full remote feed voltage and withstand potential extraneousg and lightening voltages. In uses wherein particularly high surge voltages are expected, a relay is preferably employed in accord with FIG. 3 instead of the field effect transistor 7. A significant advantage of this arrangement is thereby retained, namely that the main current circuit is not conducted via a mechanical contact.

Figure 3:
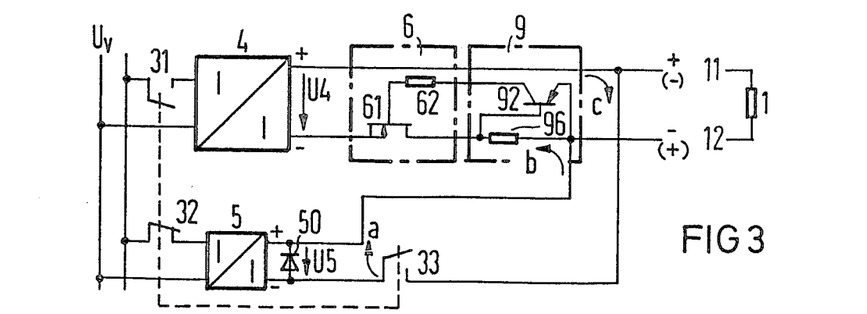
FIG. 3 is a schematic circuit diagram of a circuit arrangement constructed in accordance with the principles of the present invention having two feed circuits of which the one is conducted via an electronic switch and the other is conducted via a mechanical switch to a common load resistor.

The circuit arrangement shown in FIG. 3 largely coincides with that shown in FIG. 1. The single departure is that the electronic switch 7 of FIG. 1 is replaced by the mechanical contact 33. The contact 33 is always closed when the feed circuit 5 is activated. This, for example, can be achieved by connecting the winding of relay to the input of the feed circuit 5, and the contact 33 belongs to this relay.

The electronic switch 6 can be retained as such in an advantageous way because no high demands are made of its ability to inhibit. It need only be capable of inhibiting the relatively low locating voltage and the voltages from the surge voltage arrestors 27 or, respectively, 27a in the locating circuit. The mechanical contact 72 in the locating circuit can be more easily accepted since it is only required in the malfunction case.

The circuit arrangement of FIG. 3 is also insensitive to the overlap of the two output voltages of the feed circuits 4 and 5. When, for example, the contacts 32 or 33 are closed and when contact 31 is also closed, the field effect transistor 61 becomes transmissive. The constant remote feed current $I_F$ now flows along arrows a, b, c and flows through the diode 50. For the locating convertor 5, this means a short-circuit at the output. The locating convertor 5 thus must be short-circuit-proof in this case when operational overlaps of the main and locating voltage are possible.

Figure 6:
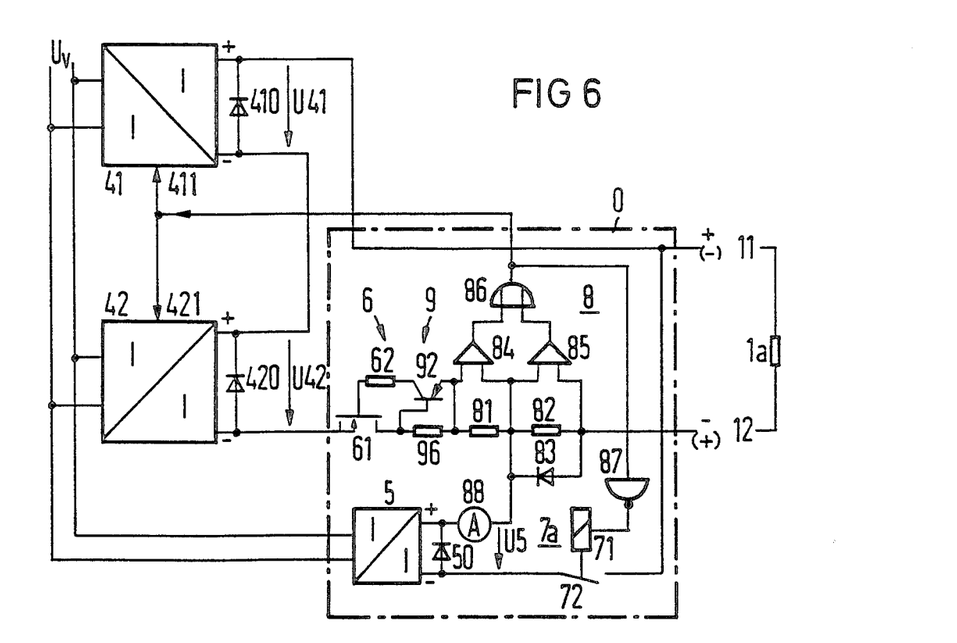
FIG. 6 is a schematic circuit diagram of a circuit arrangement wherein one of two feed circuits is composed of two remote feed devices and the other is disposed in a fault locating device.
Figure 7:
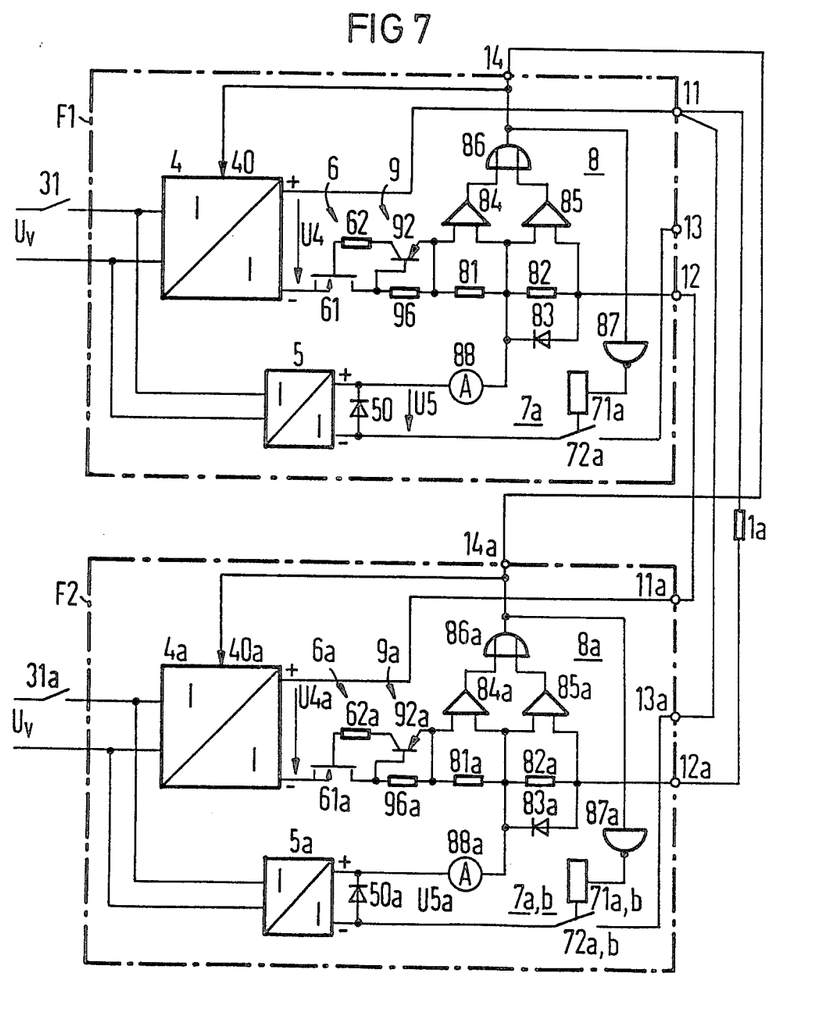
FIG. 7 is a schematic circuit diagram of a circuit arrangement constructed in accordance with the principles of the present invention having two identically designed remote feed devices which each contain a remote feed current source and a test voltage source.

FIG. 4 shows a switch device having an electronic switch 60 and comprising control means 90 which are employed as electronic switch 6 and control means 9 (FIGS. 1, 3, 5, 6, 7) or as electronic switch 6a and control means 9a (FIG. 7). The electronic switch 60 is controlled by the control means 90 dependent on the load current of the allocated feed circuit. The electronic switch 60 and the control means 90 form an automatically functioning switch means which automatically connects the feed voltage 4 to the load resistor 1 or separates it from the load resistor.

The source-drain path of the field effect transistor 61 is disposed in the current path leading from the negative pole of the feed circuit 4 to the load resistor 1. The field effect transistor 61 has its control electrode conducted via the resistor 62 to the control terminal S. The resistor 64 and the Zener diode 63 are parallel to the gate-source path, this Zener diode 63 being polarized in the non-conducting direction for the voltage to be applied to the control path of the field effect transistor.

The thyristor 65 is parallel to the source-drain path of the field effect transistor 61. The thyristor 65 has its anode conducted to the drain electrode of the field effect transistor 61. With reference to the current which is at the output of the feed circuit 4, it is polarized in the conducting direction. The control electrode of the thyristor 65 is conducted via the resistor 66 to the cathode and via the Zener diode 67 to the anode of the thyristor 65. The Zener diode 67 has its cathode connected to the anode of the thyristor 65 so that it is polarized in the non-conducting direction for currents which derive from the feed circuit 4. The diode 68 is disposed with a polarity parallel to the source-drain path of the field effect transistor 61 such that the thyristor 65 and the diode 68 are connected and antiparallel.

The Zener diode 63 protects the gate-source path against excessively high voltages. The resistor 64 is a matching resistor and the resistor 62 is a drive resistor. These resistors 62 and 64 can be extremely high impedances since a static gate current is not required.

When the switch device is controlled dependent on the output voltage of the feed circuit 4, difficulties can arise when operating conditions are possible wherein the feed circuit 4 only emits a very low output voltage which does not fully drive the electronic switch 4. The switch device shown in FIG. 4 avoids these difficulties.

The electronic switch 60 is controlled by the control means 90. The control means 90 contains the low impedance resistor 96 which, in series with the source-drain path of the field effect transistor 91, is inserted into the current path leading from the negative pole of the operative feed circuit to the load resistor 1. The junction of field effect transistor 61 and resistor 96 is conducted via the resistor 93 to the base of the bipolar transistor 94. That terminal of the resistor 96 facing away from the field effect transistor 61 is conducted via the resistor 95 to the emitter of the transistor 92. The collector of the transistor 92 is connected to the control terminal S of the electronic switch 60. Further, the emitter of the transistor 92 is conducted to the source of the field effect transistor 61 via the Zener diode 91, polarized in the non-conducting direction for the feed current.

The feed circuit 4 is a source impressed current. Drive of the field effect transistor 61 ensues dependent upon this impressed current.

The field effect transistor 61 is augmented by the thyristor 65 which is preferably a miniature thyristor. When the electronic switch 60 is not driven at the control terminal S and when a voltage builds from the drain in the direction toward the source electrode, the arrangement behaves as a four-layer diode. When the Zener voltage of the Zener diode 61 is exceeded, then the thyristor 65 triggers. The current in the thyristor 65 is accepted by the field effect transistor 61 as soon as the gate is driven. The acceptance of the current ensues fully, since the forward voltage of the field effect transistor 61 amounts to only a fraction of that of the thyristor 65. When, subsequent thereto, the drive is in turn removed from the control terminal S, the arrangement again inhibits since the thyristor 65 was currentless.

When a rising voltage is applied such to the series connection composed of the source-drain path of the field effect transistor 61 and the resistor 96, such that the external terminal of the resistor 96 lies at positive potential and the source of the field effect transistor 61 lies at negative potential, no current flows until a defined value of this voltage is reached. Only when this defined voltage value is exceeded does the electronic switch become low-impedance and current can flow via the thyristor 65 of the electronic switch 60. When the feed circuit 4 is a source of a constant impressed current, a voltage drop arises across the resistor 96 by means of which a base current defined by the resistor 93 flows in the transistor 92. The transistor 92 thus becomes conductive and the control terminal S assumes approximately the potential of the terminal 12. As a result, the MOSFET transistor 61 becomes conductive and accepts the current of the parallel-connected thyristor. This enables reliable inhibiting of the electronic switch in the case of a switch-over from the feed circuit 4 to a further feed circuit, for example to the feed circuit 5 of FIG. 1 or 3.

Since the gate G of the field effect transistor 61 is connected to the source via the Zener diode 63, given very high currents through the resistor 96 such as occur, for example, given a short-circuit at the output of a remote feed device, a part of these currents would flow through the transistor 92 and destory it. The protective resistor 95 which is of significantly higher impedance than the resistor 96 assures that no harmful currents can flow via the transistor 92 even in such a case. Further protection for the transistor 92 is obtained by the Zener diode 91. As a bypass, it accepts a part of the high currents. When the switch is employed in a device according to FIG. 1 or 3, the Zener voltage of the Zener diode 91 is dimensioned greater than the output voltage of the feed circuit 5, since leakage currents which load the feed circuit 5 could otherwise flow via the output of the non-activated feed circuit 4 given an activated feed circuit 5.

Given the circuit arrangement shown in FIG. 4, the field effect transistor 61 is of the n-type and is disposed in the negative line. When a field effect transistor of the p-type is disposed in the positive line together with the second resistor, the gate drop resistor 62 is to be connected to an npn transistor. Further, the source electrode and the anode of the corresponding thyristor must then be connected to the positive pole of the allocated feed circuit.

Figure 5:
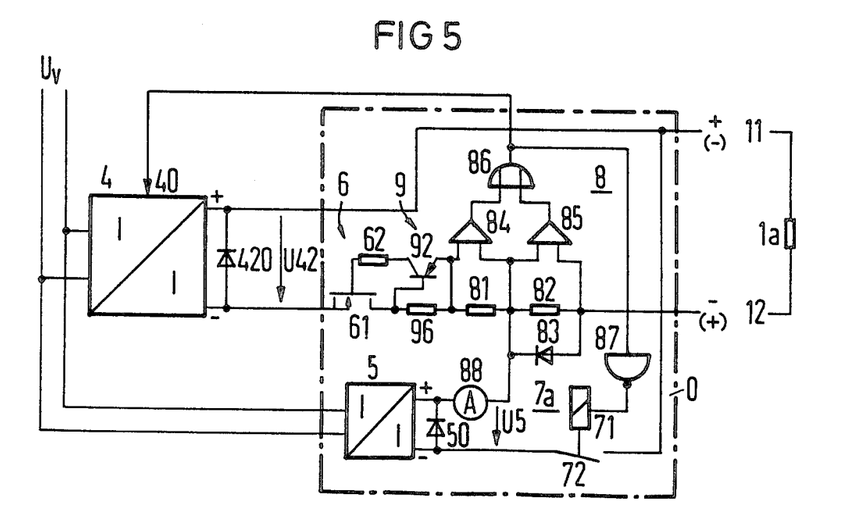
FIG. 5 is a schematic circuit diagram of a circuit arrangement wherein one of two feed circuits is disposed in a remote feed device and the other is disposed in a fault locating device.

The circuit arrangement shown in FIG. 5 is composed of two units, namely the feed circuit 4 serving as a remote feed current source and the unit O. The unit O contains the feed circuit 5 at whose output the diode 50 polarized in the non-conducting direction for the output voltage is effective. The positive pole of the feed circuit 5 is conducted via an ammeter 88 and a resistor 82 to the terminal 12 of the remote feed loop 1a. The drain electrode of the field effect transistor 61 is conducted to the terminal 12 of the remote feed loop 1a via the resistor 96, the resistor 81 and the resistor 82 in series therewith. A diode 83 polarized in the forward direction for the remote feed current is parallel to the resistor 82. A comparator 84 is connected to the resistor 81 a comparator 85 is connected to the resistor 82. The outputs of the comparators 84 and 85 are conducted via an OR element 86 to the control input 40 of the feed circuit 4. Further, a relay 71 is connected an the invertor 87 to the output of the OR element 86.

When the precision resistor 82 is supplied with sufficient current, an "on" command is forwarded to the control input 40 of the remote feed device 4 via the comparators 84 and 85 and via the OR stage 86, and an "off" command is forwarded to the relay 71.

When the remote feed path 1a is interrupted, the precision resistors 81 and 82 are currentless at first. This produces an "off" command to the remote feed device 40 via the OR stage 86 and an "on" command to the relay 71.

The electronic switch 6 which is controlled via the control means 9 prevents a short-circuit of the locating current via the remote feed device 40. The locating current at the ammeter 88 provides information regarding the status of the remote feed path 1a. Every locating current has an interrupted line field allocated to it. When the remote feed path is in proper order, so much current flows via the precision resistor 82 that an "off" command is forwarded to the relay 87 and an "on" command is forwarded to the remote feed device 40.

The circuit arrangement of FIG. 6 largely coincides with that of FIG. 5. Departing from FIG. 5, two feed circuits 41 and 42 are provided instead of the feed circuit 4, these being connected parallel to one another at the input and in series with one another at the output. The feed circuits 41 and 42 have respective diodes 410 and 420 effective at their respective output which are polarized in the non-conducting direction for the output voltage. The output of the OR element 86 is conducted to the control inputs 411 and 421 of the feed circuits 41 and 42. The load is formed by the remote feed loop 1a.

The circuit arrangement is composed of three units, namely the remote feed device 41, the remote feed device 42 and the unit O which serves as an additional automatic locating means for testing the loop impedance of the remote feed loop 1a.

Given the circuit arrangement shown in FIG. 7, the remote feed loop 1a is fed by two series-connected remote feed current sources. Differing from the circuit arrangement of FIG. 6, two identically constructed units F1 and F2 are employed. The units F1 and F2 respectively largely coincide with the circuit arrangement of FIG. 5 and are each a remote feed device having a built-in, inherent locating circuit. The single deviation is that the relay contact 72 is not rigidly connected to the terminal 11, but is conducted out at its own terminal 13.

The employment of identical remote feed devices has the advantage that no separate locating insert need be manufactured. The circuit arrangement of FIG. 7 also satisfies the demand for interchangability of the remote feed devices.

The same reference characters as in FIG. 5 are employed for the unit F2 in FIG. 7. The otherwise identical reference characters for the unit F2 are respectively provided with the letter "a".

The terminal 12 of the unit F1 is connected in series with the terminal 11a of the unit F2. Further, the terminal 11 of the unit F1 is connected to the terminal 13a of the unit F2. The outputs of the OR elements 86 and 86a are connected to one another via the connection of the terminals 14 and 14a.

A remote feed means is shown in FIG. 7 having two series-connected remote feed sets F1 and F2 which are constructed in identical fashion, and which respectively contain a complete locating means. When the remote feed path 1a is interrupted, the precision resistors 81 and 81a become currentless and the remote feed devices F1 and F2 are shut off. Simultaneously, an "on" command is supplied to the locating relays 71a and 71ab. Since the locating device 8 of the device F1 is not connected to the remote feed path, it cannot disrupt the locating operation of the remote feed device F2. The ammeter 88a provides information regarding the location of the line interruption. The precision resistor 82a determines whether the remote feed line 1a is in proper order. When this is the case, the relay contact 72ab is opened. Further, the devices F1 and F2 are switched on in common.

The connection between the terminals 14 and 14a can be eliminated under given conditions. When, in this embodiment, the precision resistor 82a determines that the remote feed path 1a is in proper order, at first it does not switch the device F1 on since its locating device cannot measure anything. However, a current which comes from the series-connected device F2 already flows through the device F1. The precision resistor 81 now registers whether this current has exceeded a defined value. When this is the case, the device F1 is also switched on.

In both instances, the involved, potential-free cross-connections between the remote feed devices are eliminated since the connecting line 14–14a lies approximately at ground potential. This can be advantageous given non-linear users, particularly given convertors which require a high start-up voltage.

When the device F1 is switched on via the additional connecting line 14a–14 in a master-slave method, following the test of the remote feed path, the full remote feed voltage is applied to the remote feed path in a single step.

The field effect transistor 61 should inhibit when the device F1 is not switched on. This occurs since the device F2 always switches on first after the locating. Without the thyristor 65, the field effect transistor 6 would accept the full output voltage of the device F2 without becoming conductive and would thus prevent the activation of the device F1. The same would occur if the switch 31, which is an automatic switch, were engaged and the switch 31a were erroneously left open.

The switch device shown in FIG. 4 initially has the behavior of a four-layer diode, so that the desired activation of the device F1 is possible. This is followed by the behavior of a transistor. This is likewise necessary since, given an interruption of the remote feed path 1a, a transition from the conductive condition into the inhibiting condition must be undertaken.

At the same time, the thyristor 65 is a protection for the field effect transistor 61 against extraneous and lightening voltages. No voltage higher than the Zener voltage of the Zener diode 67 can occur at the field effect transistor 61 from the drain to the source electrode. This Zener voltage is somewhat higher than the locating voltage so that the ability to inhibit of the arrangement is guaranteed during locating. For protecting the arrangement against excess voltages from the source to the drain electrode, a diode 68 is connected in parallel. When a thyristor which has diode behavior from the cathode to the anode, for example a so-called gate turn-off thyristor, is employed as the thyristor 65, the thyristor 65 assumes the protective function of diode 68 and the diode 68 itself can be eliminated. The Zener voltage of the Zener diode 91 is greater than the intended locating voltage. Leakage currents may flow via the inner remote feed circuit when the remote feed path 1a is charged with the locating voltage, but these leakage currents can be accepted given sufficiently high current reserves of the locating voltage source.

The mechanical switches 31 and 32 at the 60 V side of the feed circuits can be replaced with little outlay by suitable design of the feed circuits, particularly by selection of the switching transistors of the circuit arrangements designed as convertors. An example of this proceeds from FIG. 8. One invertor can, in accord with FIG. 8, be activated or deactivated in that the control electronics which emits the turn-on pulses to the switching transistor 46 is enabled or inhibited by means of a control voltage.

Figure 8:
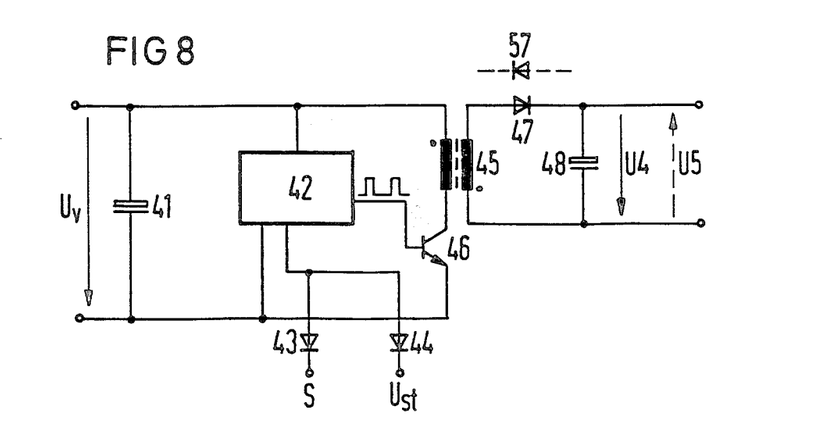
FIG. 8 is a schematic circuit diagram of a feed circuit which is designed as a stoppable converter.

The primary winding of the repeater 45 is connected pulsewise by means of the transistor 46 to the capacitor 41 lying at supply voltage $U_V$. The control electronics 42 for the drives the transistor 46, this control electronics 42 having two control inputs for an inhibit signal IL or for a control voltage $U_{St}$ which are decoupled from one another by means of the diodes 43 and 44. The secondary winding of the repeater 45 is conducted via the diode 47 to the output capacitor 48. The poling of the diode 47 yields the positive output voltage U4. When the diode 47 is replaced by the diode 57, then the oppositely polarized voltage U5 at the output.

The fed circuit shown in FIG. 8 is designed in a known manner (Funkschau 1/1983, page 68) as a single-ended blocking oscillator. The switching transistor 46 is transmissive during the pulse duration. Given a constant period duration, the pulse duration, and thus the voltage U4 or U5, is modified by the control voltage $U_{St}$. When the negative control voltage becomes greater in magnitude, the pulses become increasingly narrow and finally disappear. The output voltage U4 or U5 then becomes "0". The voltage U4 or U5 can also be brought to "0" at the terminal S independently of the control voltage $U_{St}$ by applying a suitable voltage.

When the diode 47 in FIG. 8 is replaced by the diode 57, the fundamental circuit diagram of a flow convertor is obtained. Drive of the pulses and the electronic device shut-off remains fundamentally maintained.

Although various minor changes and modifications might be proposed by those skilled in the art, it will be understood that I wish to include within the claims of the patent warranted hereon all such changes and modifications as reasonably come within my contribution to the art.

I claim as my invention:

1. A circuit for supplying a current to a load connected to a pair of output leads of said circuit comprising:
    at least one feed circuit;
    an electronic switch disposed between said feed circuit and said leads having a transistor with a control electrode and a controlled path;
    control means for operating said electronic switch to disconnect said feed circuit from at least one of said leads when said feed circuit is de-energized and to connect said feed circuit to at least one of said leads when said feed circuit is energized, said control means having a further transistor with a controlled path connected in series with said control electrode of the transistor in said electronic switch and a control electrode connected at a node to said controlled path of said transistor in said electronic switch, and a resistor connected between said node and a terminal of said one of said leads;
    a thyristor having an anode and a cathode connected in parallel with said controlled path of said transistor in said electronic switch and having a trigger electrode; and
    a further resistor and a Zener diode connected in series in a branch in parallel with said thyristor anode and cathode, said Zener diode having a polarity opposite said thyristor and said trigger electrode being connected between said further resistor and said Zener diode.

2. A circuit as claimed in claim 1 wherein said feed circuit is a constant current source.

3. A circuit as claimed in claim 2 wherein said constant current source has a load circuit, and further comprising at least one additional constant current source disposed in said load circuit.

4. A circuit as claimed in claim 1 further comprising an additional resistor connected between the control electrode of said further transistor and said node.

5. A circuit as claimed in claim 1 further comprising an additional resistor connected in parallel with the control path of said transistor in said electronic switch, and another resistor connected between the controlled path of said further transistor and said resistor.

6. A circuit as claimed in claim 5 further comprising a Zener diode having a polarity in a non-conducting direction for an output current of said feed circuit disposed in parallel with the series-connected controlled path of said transistor in said electronic switch, said resistor and said another resistor.

7. A circuit as claimed in claim 1 further comprising a Zener diode connected in parallel with a control path of the transistor in said electronic switch, and another resistor connected between the controlled path of said further transistor and said resistor.

8. A circuit as claimed in claim 7 further comprising an additional Zener diode having a polarity in a non-conducting direction for an output current of said feed circuit disposed in parallel with the series-connected controlled path of said transistor in said electronic switch, said resistor and said another resistor.

9. A circuit as claimed in claim 1 further comprising an additional resistor and a Zener diode each connected in parallel with the control path of the transistor in said electronic switch, and another resistor connected between the controlled path of the further transistor and said resistor.

10. A circuit as claimed in claim 9 further comprising an additional Zener diode having a polarity in a non-conducting direction for an output current of said feed circuit disposed in parallel with the series-connected controlled path of said transistor in said electronic switch, said resistor and said another resistor.

11. A circuit as claimed in claim 1 comprising two feed circuits respectively connected to said electronic switch and to said control means for connection with opposite polarity to said output leads and further comprising switching means connected between each of said feed circuits and a voltage source for energizing one of said feed circuits at a time.

12. A circuit as claimed in claim 11 wherein one of said feed circuits is a remote feed current source for supplying direct current to a remote feed loop connected to said output leads, wherein said other feed circuit is a test voltage source, and further comprising means connected to said other feed circuit for testing the impedance of said remote feed loop, and means for energizing and deenergizing said remote feed current source in dependence upon the impedance of said remote feed loop.

13. A circuit as claimed in claim 12 further comprising a remote feed current measuring resistor connected between said remote feed current source and said remote feed loop, a test current measuring resistor connected in series with said remote feed current measuring resistor and between said remote feed loop and said test current source, a diode connected in parallel with said test current measuring resistor having a polarity in the forward direction for said remote feed current, a first comparator having inputs connected across said remote feed current measuring resistor and a second comparator having inputs connected across said test current measuring resistor, and an OR gate having inputs respectively connected to the outputs of said first and second comparators, and having an output connected to a control input of said remote feed current source.

14. A circuit as claimed in claim 13 wherein said remote feed current source, said test current source, said electronic switch, said control means, said remote feed current measuring resistor, said test current measuring resistor, said first and second comparators, and said OR gate are all combined in a single unit, and wherein said test current feed circuit has an additional output forming a separately accessible output of said unit.

15. A circuit as claimed in claim 14 comprising an additional single unit identical to said single unit, each of said units being connected to said remote feed loop with said remote feed loop connecting said remote feed current sources in said units in series, and one of said separately accessible outputs of said units being connected to a current test source in one of said units.

* * * * *